(12) United States Patent
Das et al.

(10) Patent No.: US 10,750,757 B2
(45) Date of Patent: Aug. 25, 2020

(54) MILK BASED COMPOSITIONS COMPRISING MILK DERIVED, DENATURED RETENTATE

(71) Applicant: Goodman Fielder New Zealand Limited, Ellerslie, Auckland (NZ)

(72) Inventors: Shantanu Das, Auckland (NZ); Namrata Taneja, Auckland (NZ); Sonya Dianne Olney, Auckland (NZ); Ashling Ellis, Auckland (NZ); Christopher Edward Hall, Auckland (NZ); Harjinder Singh, Auckland (NZ); Aiqian Ye, Auckland (NZ)

(73) Assignee: Goodman Fielder PTE. LTD, Singapore (SG)

( * ) Notice: Subject to any disclaimer, the term of this patent is extended or adjusted under 35 U.S.C. 154(b) by 174 days.

(21) Appl. No.: 15/320,435

(22) PCT Filed: Jan. 23, 2015

(86) PCT No.: PCT/NZ2015/000004
§ 371 (c)(1),
(2) Date: Dec. 20, 2016

(87) PCT Pub. No.: WO2016/118021
PCT Pub. Date: Jul. 28, 2016

(65) Prior Publication Data
US 2017/0223977 A1 Aug. 10, 2017

(30) Foreign Application Priority Data

Jan. 23, 2015 (NZ) ........................................ 704054

(51) Int. Cl.
*A23C 9/152* (2006.01)
*A23C 21/06* (2006.01)
*A23J 3/08* (2006.01)
*A23L 2/54* (2006.01)
*A23L 2/66* (2006.01)
*A23C 9/142* (2006.01)
*A23C 9/15* (2006.01)

(52) U.S. Cl.
CPC .......... *A23C 9/1524* (2013.01); *A23C 9/1422* (2013.01); *A23C 9/1512* (2013.01); *A23C 21/06* (2013.01); *A23J 3/08* (2013.01); *A23L 2/54* (2013.01); *A23L 2/66* (2013.01); *A23C 2210/30* (2013.01); *A23V 2002/00* (2013.01)

(58) Field of Classification Search
CPC ... A23C 9/1524; A23C 9/1422; A23C 9/1512; A23C 21/06; A23C 2210/30; A23J 3/08; A23L 2/54; A23L 2/66; A23V 2002/00
USPC ................................ 426/520, 564, 580, 657
See application file for complete search history.

(56) References Cited

U.S. PATENT DOCUMENTS

| 4,840,813 | A | 6/1989 | Greenberg et al. |
| 5,114,729 | A | 5/1992 | D'Aprigny et al. |
| 2007/0065555 | A1 | 3/2007 | Soane et al. |
| 2011/0244076 | A1 | 10/2011 | Clark et al. |
| 2017/0000148 | A1* | 1/2017 | Das .......................... A23L 2/54 |

FOREIGN PATENT DOCUMENTS

| CN | 101156629 B | 3/2011 |
| GB | 2035330 A | 6/1980 |
| NZ | 563869 A | 10/2008 |
| NZ | 552132 A | 4/2009 |
| NZ | 564378 A | 2/2011 |
| NZ | 587796 A | 6/2012 |
| WO | 1992020239 A1 | 11/1992 |
| WO | WO 9302567 | 2/1993 |
| WO | 9633618 A1 | 10/1996 |
| WO | 2007108709 A1 | 9/2007 |
| WO | 2008077071 A1 | 6/2008 |
| WO | 2011099876 A1 | 8/2011 |
| WO | WO 2012017043 | 2/2012 |

OTHER PUBLICATIONS

El-Samragy, Y.A. et al.: "Production of Ultrafiltered Skim Milk Retentate Powder 1. Composition and Physical Properties" J Diary Sci (1993) vol. 76.
Anonymous: "Microfoam" Wikepedia, the free encyclopedia [retrieved from internet on Mar. 24, 2015] <URL: http://en.wikipedia.org/wiki/Microfoam>, Published on Feb. 21, 2012.

* cited by examiner

*Primary Examiner* — Leslie A Wong
(74) *Attorney, Agent, or Firm* — Gable Gotwals (57) ABSTRACT

The invention relates to the use of milk derived, denatured retentate in the preparation of milk-based compositions, which may be aerated or non-aerated, comprise a skimmed mild source, and/or have less than 0.5% w/w fat. The milk derived, denatured retentate allows the formation of microbubbles in an aerated skimmed milk composition, and thus retains certain desirable sensory perception characteristics such as a good mouthfeel and perceived thickness.

13 Claims, 5 Drawing Sheets

MILK BASED COMPOSITIONS COMPRISING MILK DERIVED, DENATURED RETENTATE

CROSS-REFERENCE TO RELATED APPLICATIONS

This United States application is the National Phase of PCT Application No. PCT/NZ2015/000004 filed 23 Jan. 2015 which claims priority to New Zealand patent application No. 704054 filed 23 Jan. 2015, each being incorporated herein by reference.

TECHNICAL FIELD

The present invention relates to an improved beverage and method of manufacture. More specifically the invention is directed towards a dairy-based beverage which retains certain desirable sensory perception characteristics such as a good mouthfeel and perceived thickness.

BACKGROUND ART

There is a commercial benefit to providing many beverages, and in many cases foods, which have desirable sensory characteristics, such as flavour, mouthfeel, texture, smoothness/creaminess, and overall indulgency.

Often this is achieved by ensuring a high amount of fat content is present in the beverage, which generally provides all of these characteristics. A good example of this are thick-shakes as produced by fast-food outlets such as Wendy's™, McDonalds™ and so forth, which will have thick-shakes with a fat content significantly higher than say standard market milk (3.3% fat), sometimes in the order of up to 9% or more. The products are certainly desirable from an indulgency perspective.

Yet given the high fat and high calorie content in these beverages, they can be disadvantageous from a health perspective, as both a high calorie and high cholesterol diet are associated with a range of health issues such as obesity and heart disease. There is a definite need and desire from the public for beverages that retain these desirable sensory characteristics, yet are also healthier.

An important characteristic of thick-shakes is bubbles/froth, which is created by adding ice-cream. This froth has a positive impact on mouthfeel. However the addition of ice-cream not only increases the concentration of fat but also has other negative impacts—firstly, it's not available everywhere and secondly it contains various non-dairy ingredients such as emulsifiers.

An alternative to thick-shakes are milkshakes which lack ice-cream and subsequently have a lower fat content. However a disadvantage of milkshakes is a loss of sensory characteristics, particularly the indulgent mouthfeel provided by a high fat beverage.

In attempt to address these problems, various products and/or methods have been developed.

For example, NZ 563869 is directed towards using hydrophobin proteins and a surfactant to better retain gas bubbles within food products to improve the texture.

NZ 587796 is directed towards using alternan (polysaccharides made up of glucose units) as a thickening agent for various foodstuffs or beverages. Even within this document, there is reference to many thickening agents such as starch, gums, and so forth that are well known as conventional thickening agents to improve overall mouthfeel of a product without resorting to, in some cases, increased fat content.

NZ 552132 discloses an acidic milk drink that has a low fat, low calorie acidic milk drink yet with achieving a good flavour and light texture. It relies on inclusion of polydextrose and sugar.

In another example, US 2007/0065555 discloses a stabilised dairy foam which includes milk, a surfactant, a polysaccharide and a polymer.

In NZ 564378, methods of preparing frothy milk based beverages such as cappuccinos are described, including conventional techniques such as applying pressure and heat to produce bubble formation.

In other examples such as US 2011/0244076, CN 101156629B and WO 1996/033618, carbonation techniques are described in milk-based beverages for a number of reasons. However, these processes require pressurized gas (typically $CO_2$ or N) which has a number of disadvantages.

First, carbonation requires specialized techniques and equipment, such that the beverage cannot be made conveniently like using mechanical aeration techniques. Second, in the context of milk based products, the fizzy texture from carbonation is not what many users are used to nor desire—such that carbonation is more often not only applied to non-dairy based soft drinks. Third, and again in the context of milk based products, the pH of the milk-based product decreases once carbonated, and this can lead to undesired stability issues with beverages such as coffee, which already lowers the pH somewhat.

These documents exemplify the need and the lengths to which the industry has gone to develop substitutes which provide good sensory characteristics without resorting to high fat products.

However, the main disadvantages of such products include:

Resorting to exogenous components such as gum or hydro-colloidal components (i.e. exogenous non-dairy components) to achieve the sensory characteristics, and/or improved volume retention. This is undesirable from a public perspective. The public prefers to have a product with a minimal amount (or none) of exogenous additives.

Some of the added components may lead to a displeasing flavour or texture, despite improving the viscosity and/or bubble retention.

The components may inconveniently lead to added manufacturing costs, complicated processing, or difficulty in its use.

Despite aiming to achieve good bubble formation in cases such as US 2007/0065555 or NZ 564378, the persistency of the bubbles may be poor, meaning that the end user may only have a short period to consume their beverage before the mouthfeel subsides.

In cases such as NZ 564378, the methodology and products may be overly complicated, inconsistent, and/or only be applicable to hot drinks. It would be beneficial to have a product that is easy to prepare and is applicable towards cold and hot beverages.

It is an objective of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the following description which is given by way of example only.

DISCLOSURE OF THE INVENTION

Previously, the same Applicant developed a novel composition for producing aerated beverages which has excellent sensory perception results. Unlike the prior art described herein, it avoided use of high fat levels and using exogenous foreign excipients to achieve the beneficial mouth feel, look and taste following aeration. The previous invention was based on the use of recombined milk which had much lower levels of fat (about 1.5 to 5% w/w), yet surprisingly showed excellent sensory perception results. Using recombined milk (preferably with a heat denatured retentate added), it was shown that the sensory results were considerably better than standard 3.5% w/w fat milk, and were even comparable to 9% w/w fat thick-shakes. This represented a considerable breakthrough in the commercial field of frothy beverages, as it provided a low fat, and a more "natural" option for many hot and cold frothy beverages easily through simple aeration of the composition (not carbonation), yet still provided the commercially important sensory perception requirements.

According to a first aspect of the present invention there is provided a milk-based composition including a skimmed milk source
characterised in that the composition includes:
    less than about 0.5% w/w fat; and
    a milk-derived, denatured retentate.

According to a further aspect of the present invention there is provided a milk-based composition including a skimmed milk source
characterised in that the composition includes:
    less than about 0.5% w/w fat; and
    a milk-derived, denatured retentate;
and wherein the ratio of denatured to un-denatured protein in the composition is in the range of between about 10:90 to 90:10.

According to a further aspect of the present invention there is provided an aerated beverage
characterised in that the aerated beverage includes:
    a skimmed milk source;
    less than about 0.5% w/w fat; and
    a milk-derived, denatured retentate.

According to a further aspect of the present invention there is provided an non-aerated beverage
characterised in that the non-aerated beverage includes:
    a skimmed milk source;
    less than about 0.5% w/w fat; and
    a milk-derived, denatured retentate.

According to a further aspect of the present invention there is provided a use of a milk-derived, denatured retentate to create a non-aerated or aerated milk-based composition or beverage with less than about 0.5% w/w fat.

According to a further aspect of the present invention there is provided a method of denaturing a milk derived, retentate for use in a milk based composition as described herein
characterised by the steps of
    a) denaturing the milk derived retentate at about 60-95° C. for a duration of about 5-120 minutes prior to adding the denatured retentate to a skimmed milk source to produce the composition.

According to a further aspect of the present invention there is provided a method of manufacturing a milk-based composition as described herein
characterised by the step of
    a) combining a skimmed milk source with a milk derived, denatured retentate;
    b) optionally increasing solid content to between about 9 to 12% w/w;
    c) optional further downstream processing selected from the group consisting of homogenization, pasteurization and/or UHT treatment; and
    d) optional aeration prior to consumption.

In the present application and as a result of ongoing research and development, the same inventors produced a significantly improved composition which has further commercial advantages. Once the composition has been aerated, the composition displays beneficial stable micro-bubbles, providing a rich mouth feel. These features were surprisingly retained when the fat component (previously from recombined milk) was removed, and the composition simply relied upon a skimmed milk source, and a milk derived, denatured retentate. Without denaturing the retentate, the micro-bubbles did not form, and the beneficial results were not observed.

As a result, the new composition's fat content was kept at essentially zero (about 0.2% w/w) and still showed remarkable foaming and sensory perception results. This is a significant and unexpected result as the composition is substantially devoid of any fat, which was thought to be needed to contribute significantly to the desired characteristics, in terms of viscosity, mouth feel and stability.

Additionally, the inventors surprisingly identified that the combination of the skimmed milk and milk-derived, denatured retentate actually provides an improved mouthfeel as an non-aerated beverage compared to Calci-trim (having similar fat (0.2% w/w) and protein levels to the preferred composition) and even Light Blue having a higher fat content of about 1.5% fat. Therefore, the present invention has applicability not only as an aerated beverage, but also as a non-aerated low fat milk based beverage with improved mouthfeel.

Taking a step further, the inventors then identified a significant phenomenon, in that if the ratio of denatured to un-denatured protein in the composition is in the range of between about 30:70 and 70:30, the beneficial results (foam volume and foam quality (i.e. micro-foam), which gives the mouth feel are particularly well pronounced, as will be illustrated further in this specification. The denatured protein may typically be provided by the denatured retentate, and the un-denatured protein may be provided by the skimmed milk source (or other component, as discussed further below).

The avoidance of fat is beneficial because:
It is healthier than the high fat alternatives, or even the lower fat option previously invented by the Applicant which typically used 1-5% fat content (unpublished);
Milk containing fat may have long term shelf-life issues;
Fat addition, either in the process of using recombined milk, or other sources, may be expensive and cumbersome.

The use of the denatured retentate appears to be a key in converting an otherwise unstable system such as aerated skimmed milk into a composition that produces very stable, velvety foams.

Other milk based compositions such as those described in WO 2012/110705, WO 2013/004895 and WO 2012/056106, which are used for different applications such as low lactose milk or whey protein products, include milk derived ultra filtrate retentates. However, any heat treatment which has been in processing these compositions are performed under different conditions due to their different purpose (i.e. simply to sterilise the final composition, or to pre-treat the raw milk to develop certain characteristics, not the isolated retentate itself).

Like the previous composition developed by the Applicant, it requires only dairy based constituents and therefore provides good customer acceptance, negates the need for high fat, and is easy to store and ultimately use.

It should also be appreciated that the inventors of the present invention are all food scientists with established track records in the industry. One co-inventor in particular is not only a food scientist, but has worked with and processed milk for a number of years in India and also New Zealand.

Further advantages of the present invention and its preferred features will become apparent with the ensuing description.

Preferred Embodiments

Throughout the specification, the term "aerated" or variations thereof should be taken as meaning a beverage which has been adapted, developed, or prepared to include air or gas bubbles (i.e. typically, although not solely, atmospheric air) dispersed homogenously within, or just within a portion of, the beverage for a period of time.

In a liquid, the term "non-aerated" used throughout this specification should be taken as meaning a composition or beverage that has not been manipulated to include a higher than normal level of air or gas bubbles. Of course, most compositions or beverage will have some underlying natural level of dissolved gas or air trapped within it, and the term "non-aerated" is intended to encompass this.

It should be appreciated that the term aeration should not be confused with the well known process of carbonation, the latter which utilises gas ($CO_2$) under pressure to create bubbles. Aeration, on the other hand, requires mechanical energy to help create the bubbles. The use of composition according to the present invention helps to produce such bubbles under mechanical aeration, improve stability and provide a number of other benefits which will be discussed throughout this specification.

Therefore according to one aspect of the present invention of forming an aerated beverage does not correspond to previously known carbonation techniques. However, it should be appreciated that the present invention could also be used with carbonated beverages if so desired. In many aspects of the present invention, carbonation is seen to be disadvantageous as it lowers the pH of neutral milk. In one example, coffee lowers the pH of milk, so application of carbonation techniques would disadvantageously lower the pH further and result in stability issues which are avoided by the present invention.

Throughout this specification, the term "bubbles" should also be understood to encompass foam within or as part of a liquid, and so forth. Micro-foams are discussed throughout this specification, which are well known in the art to be distinct to macro-foams. Micro-foams can be advantageous over macro-foams as they provide a beneficial velvety foam, and are often linked to a good mouth feel and overall taste.

The composition may be provided as a powdered form, a solid form and/or as a liquid form (or combinations thereof).

Throughout the specification, the term "beverage" should be taken as meaning any liquid fit for animal (typically human) internal consumption. Examples include, but are clearly not limited to, cold drinks such as milkshakes, thick-shakes, frozen beverages, smoothies, frappuccinos, or hot drinks such as hot chocolate, fluffies (frothy hot milk drinks for children), or coffee-based drinks, or a frothy portion thereof, such as mochaccinos, cappuccinos, and so forth.

The present invention may also be used for nutritional or medicinal based beverages, for instance to improve the flavour, texture and mouthfeel of either medicines or supplements or as a carrier of functional ingredients.

In a further context of the invention, the term "beverage" should be understood to also encompass food and/or culinary products that have a liquid or semi-liquid based composition. For example, the present invention could be utilised for desserts which normally are heated or cooled in order to increased volume or overall mouthfeel before eating. Another example tested by the Applicant is quiche, where the composition was successfully used to replace cream. The present invention provides an alternative to such foods, where the volume (if aerated) or overall mouthfeel may be provided by the composition.

Throughout the specification, the term "bubble retention" should be referred to frequently and should be understood to mean the extent, duration and/or persistency of the increased volume of the beverage due to foam/air/gas entrapped within the beverage following aeration. An acceptable level of bubble retention will depend on the circumstance. However, in most cases a beverage is normally consumed within 20 minutes, so an acceptable duration would be approximately this timeframe or more. As will be seen in the examples, bubble duration is measured through total (liquid and foam) volume vs. time.

Throughout this specification, there is also frequent reference to sensory perception data. This sensory data was provided by a trained panel of 7-10 members, who evaluate dairy products year round. The panel has been trained for dairy sensory characteristics. For every attribute, they are provided with a guideline. For example, when assessing overall mouthfeel out of maximum score of 10, stiff creamy chocolate mousse would score a 9 for mouthfeel scale, a thick-shake (≥9% fat) would score a 7 and latte made out of regular market milk (3.3% w/w fat) would score a 5. The panel proved to be very consistent in describing and scaling the various attributes. The sensory data covers froth volume (visually), mouthfeel (connected to froth type and stability), creaminess of the film, overall flavour and finally, the thickness/body of the beverage. These are all attributes that contribute to a beverage which is aimed at providing a drink with a feeling of indulgency, flavour and overall feel.

Milk

Throughout the specification the term "milk based composition" should be taken as meaning a mixture, either solid, semi-solid, or which includes milk-derived components. This would encompass a composition with dried skimmed milk powder, reconstituted skimmed milk, and/or skimmed milk.

The term "milk" should not be limited to milk from cows or goats, but should also encompass other milk sources such as buffalo, sheep, horses or camels for example.

Preferably, the composition only has milk-based components in it.

A goal of the project was to develop and market a composition to be used for aerated beverages, where the base composition only utilised milk-based components, for instance without relying on not high fat or exogenous thickeners. Not only is this advantageous from a public viewpoint as providing a more "natural" product, but it also avoids complicated processing techniques and increases in costs, and potential instability which might arise from combining multiple components that don't normally co-exist.

However, optionally, the composition may be supplemented with other non-milk based additives such as flavourings if so desired. For example, the milk-based composition may be used to prepare flavoured compositions, such as ready to use coffee sachets.

Throughout this specification, the term "skimmed milk source" should be taken as meaning milk which has substantially all the fat (cream) has been removed from the whole milk. Although countries differ in the exact definition of fully skimmed milk, we herein define skimmed milk as having less than 0.3% w/w fat. This is comparable to semi-skimmed milk which typically has 1.5-1.7% w/w fat, and whole milk which typically has 3.3-4% w/w fat.

For clarity and comparison, recombined milk as used in the previous application, included a milk fat component, a non-fat milk component (often skimmed or partially defatted milk powder) and typically a fluid such as water. Most typically, the milk fat component is anhydrous milk fat, or freshly frozen milk-fat for recombining (FFMR), or butter, or ghee.

Fat Content

A key and unexpected advantage is that, in using the combination of a skimmed milk source and the denatured milk-derived retentate (essentially without fat), the composition still shows advantageous sensory perception and bubble retention results compared to currently available full fat and low fat milk options.

Preferably, the composition has a fat content below 0.3% w/w. If using a standard skimmed milk of 0.3% w/w fat, the resulting composition may have less fat after dilution with other excipients.

More preferably, the composition has less than 0.25% fat.

Most preferably, the composition has about 0.2% w/w fat or less.

The inventors have shown the composition works when using skimmed milk with 0.2% w/w fat, which is essentially zero. It is fully expected that if one were to use a 0.0% fat skimmed milk powder, the same results would be seen in both aerated and non-aerated samples.

Sensory perception results showed that despite the lack of fat in the composition, overall mouthfeel, texture and taste did not suffer as a consequence. Both bubble retention and sensory perception characteristics are maintained, and simultaneously may provide a much healthier option due to the lack of fat content.

In comparison to the market control products (1.5% and 3.3% commercial pasteurized milk), the present invention showed a remarkable ability as a base to be used for preparing aerated beverages with good sensory characteristics and bubble retention.

Milk-Based Retentate

The composition includes a milk-derived, denatured retentate. This retentate is a key to the invention, and its characteristics, advantages and preferred features will be discussed below.

In the case of aerated beverages, the denatured retentate is thought to be a key to enabling formation of micro-bubbles, and hence the rich mouth feel. Dry foams (or otherwise known as macro-foams) do not significantly contribute to a good mouth feel. Whereas micro-bubbles (also termed wet foam) do contribute significantly to a rich mouthfeel and are caused where the air and liquid phases are mixed together (not separated). Without the essential incorporation of the retentate (or for that matter the denaturation of the retentate), a dry foam is observed following aeration of the composition.

In the case of non-aerated beverages, the denatured retentate is also significantly contributing to the improved mouthfeel in comparison to controls.

Throughout the specification the term "milk-derived retentate" should be taken as meaning a retained portion (typically high in protein content) of a milk which does not pass through a cross flow membrane or filter, and therefore can be collected and used for a particular purpose. In the context of milk, retentates are well characterised and utilised[1]. The methodology for producing the retentate according to the present invention may rely on any such processes to prepare the retentate, although preferred features are discussed below which have been found to be particularly beneficial for the present invention.

[1] *Properties of Ultrafiltrated Skim Milk Retentate Powders*, Journal of Dairy Science, Volume 69, Issue 2, Pages 329-339, February 1986

A self-imposed preference of only using milk-based products made the task of providing a fat free composition with good foam characteristics significantly more difficult, as conventional approaches using non-dairy based ingredients were left aside (although it should be appreciated that the present invention could include non-dairy based ingredients).

The previous success of identifying and using recombined milk, preferably with a milk-derived retentate certainly offered many advantages. It is thought that the recombined milk based composition will be very successful as a base for aerated beverages for many reasons, for instance as it outperformed compositions using non-dairy based thickeners (carrageenan). However, the present invention offers a very commercially useful advantage distinct from using recombined milk, the latter which includes fat.

Preferably, the milk-based retentate is an ultra-filtrated retentate.

Ultra-filtration (UF) is a low pressure fractionation of selected milk components by molecular size. UF separates on the basis of molecular weight and the molecular weight cut off (MWCO) can range from about 1000 to 300,000. The portion of stream which passes through membrane is referred as permeate. The remainder of the stream, termed retentate, contains the solutes or suspended solids which have been rejected by the membrane. Depending on MWCO selected, the membrane will concentrate high molecular weight species while allowing dissolved salts and low molecular weight materials to pass.

UF membranes are used in numerous industries for concentration, clarification and diafiltration of large process streams. Goodman Fielder New Zealand's UF plant for retentate production uses a polyethersufone (PES) spiral wound membrane organized into three loops (modules) with MWCO of 30,000. This membrane is commonly used in dairy industry to concentrate whey and casein proteins, skim milk for various dairy applications such as milk standardization for cheese/yoghurt, and protein/calcium fortifications in milks/yoghurt.

The retentate of the present invention includes both whey protein and casein, which the inventors consider may be important to the results seen in the present invention. Without wishing to be bound by theory, the inventors consider heat treatment of milks at or above 70° C. cause denaturation of whey proteins (β-lactoglobulin), some of which may complex with casein micelles (involving K-casein) or can simply self aggregate to form polymeric products. The degree of interaction between β-lg and K-casein might depend on the time and temperature of heating, concentrations of protein, pH and presence of salts. Denatured whey proteins associated with casein micelle appear as appendages or filaments on the micellar surface in electron micrographs. These aggregates are thought to be responsible for an observed increase in viscosity, and potentially are the cause of the improved functional (such as foamability) and foam stability and sensorial properties observed in the present invention.

The retentate is denatured.

Throughout the specification, the term "denatured" should be taken as meaning that a substantial amount, or all of, the proteins within the milk-derived retentate have partially or fully lost their quaternary, tertiary or secondary structure which is present in their native state, as a result of an external stress or compound imposed on the retentate. There are numerous methods to achieve denaturation which should not be beyond the scope of the present invention. For example, heat denaturation, acid/base denaturation, use of organic solvents such as methanol and ethanol, cross-linking agents such as formaldehyde and/or radiation.

Preferably, the retentate is heat denatured.

Heat denaturation is preferred as a denaturant because of its simplicity, and because it retains an over-riding commercial preference to not include exogenous (non-milk based) materials or non-food grade materials or processes. Heat denaturation will be discussed further below.

Preferably, the milk-derived retentate contributes at least 10% w/w of overall protein to the composition.

The protein content composition can be important to achieve particularly optimal results, as is discussed further below. The use of the retentate beneficially also provides a substantial amount of protein to the composition and in this way further aids in the composition's advantages.

More preferably, the milk-derived, denatured retentate contributes approximately between 10 to 90% w/w of the overall protein to the composition.

Even more preferably, the milk-derived, denatured retentate contributes approximately between 30 to 70% w/w of the overall protein to the composition.

Most preferably, the milk-derived retentate contributes approximately between 40 to 60% w/w of the overall protein to the composition.

The inventors found that when the denatured retentate contributed more than about 70% w/w to the overall protein, then the final product became overly diluted and/or watery. This led to a loss of overall mouth feel.

As an example, a test product was prepared such that the retentate contributed 75% w/w of the total protein (4.3% w/w protein from the retentate out of a total of 5.7% w/w protein). Contrary to expectations, the sample was very watery and had a poor mouth feel. This may be due to low total solid content in the final product as retentate is devoid/low in lactose.

Oppositely, the inventors found that if the retentate contributes less than about 30% w/w to the overall protein in the composition, it is disadvantageous because as the protein level, particularly from the retentate lowers, the body and texture of the product, including bubble stability, diminishes substantially.

The beneficial were even more pronounced in the most preferred range of 40-60% w/w, and approximately 50% was seen as the most optimal amount.

A further advantage of the retentate contributing more than 30% w/w of total protein is that the retentate may be richer in calcium. Therefore, the beverages according to the present invention may easily provide about 50% of RDI of calcium, assuming a serving size of 200 mL.

The studies performed thus far indicate the most beneficial results were present when the milk-base retentate contributes about 40-60% w/w of the total protein in the composition. Advantageously, this also corresponds to the approximate ratio of denatured to un-denatured protein ratio, as discussed below (denatured protein being provided by the heated retentate).

Protein Level

Preferably, the composition includes at least 1% w/w protein.

Preferably, the composition includes between 1 to 10% w/w protein, more preferably 3 to 8% w/w, and most preferably 3.5 to 6% w/w.

The minimum protein level tested thus far in the composition was 3.5% w/w, however it is reasonable to expect that this is not the minimum amount which still provides the desired effects. The most optimum protein level seen in initial trials was at 5.7% w/w as reflected in the results.

Increasing the protein content using heat denatured whey protein solution (instead of the retentate) did not improve the mouthfeel or bubble retention of the resulting aerated product. Therefore, this experiment showed whey protein as an alternative to the retentate was not effective, although as discussed below may be useful as an additive.

Figure 4:
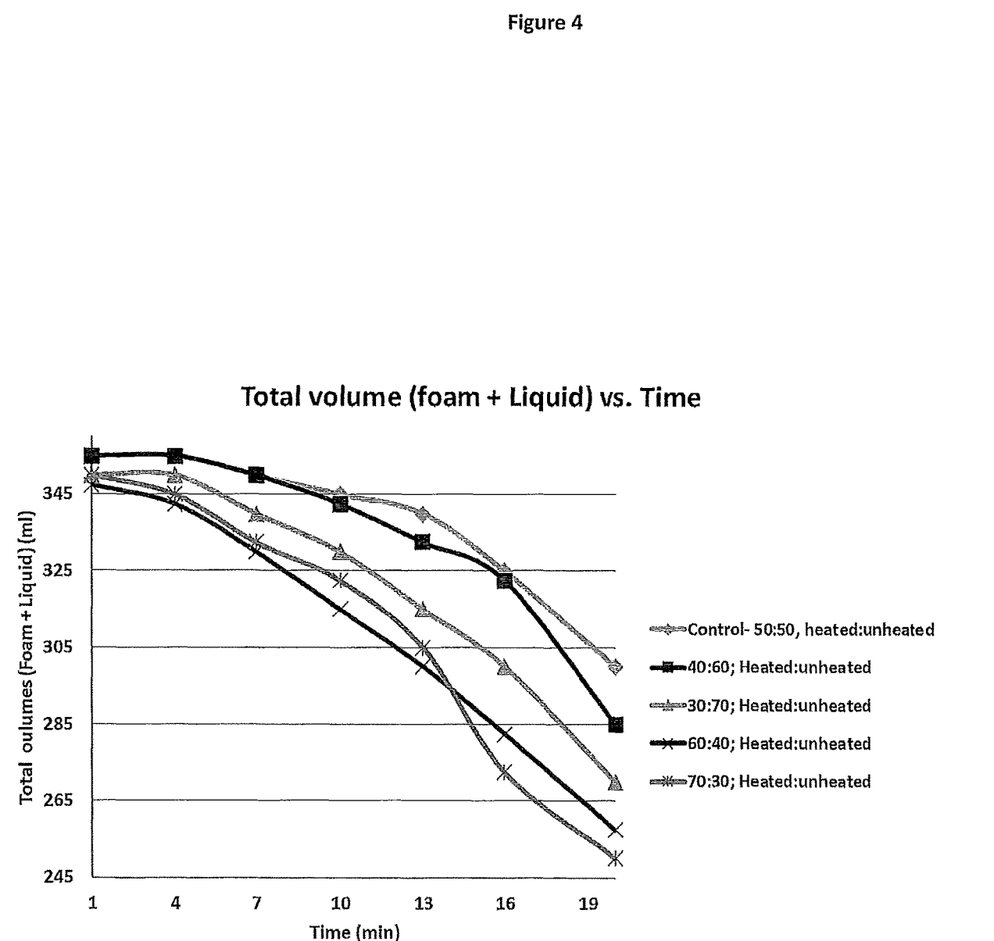
FIG. 4 Effect of ratios of denatured to un-denatured protein on total (foam and liquid) volume FIG. 5 Effect of ratios of denatured to un-denatured protein on foam volume
Figure 5:
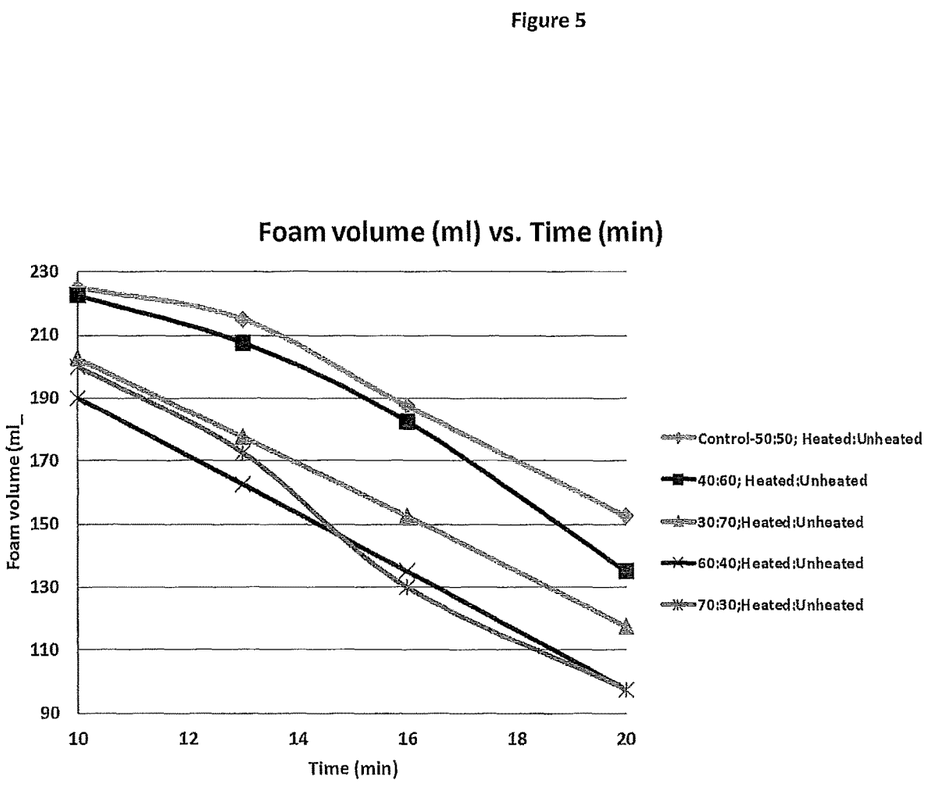

Beneficial results were observed when the ratio of denatured to un-denatured protein in the composition was configured between 10:90 and 90:10. For instance, within this range, foam stability of the composition was improved and overall flavour was also improved compared to samples with no denatured protein (i.e. normal blue top (3.3% fat) or light blue top milk (1.5% fat) samples)). Also, at the other end of the spectrum, a test sample with 100% denatured protein showed only minor improvements compared to the no denaturation sample, and showed poor taste. FIGS. 4 and 5 illustrate these results.

Preferably, the composition includes a ratio of denatured to un-denatured protein of approximately 30:70 to 70:30.

More preferably, the composition includes a ratio of denatured to un-denatured protein of approximately 40:60 to 60:40.

Even more preferably, the composition includes a ratio of denatured to un-denatured protein of approximately 45:55 to 55:45.

Most preferably, the composition includes a ratio of denatured to un-denatured protein of approximately 50:50.

As shown in FIGS. 4 and 5, preliminary trials indicate the most beneficial results may be seen when between a ratio of denatured to un-denatured protein is configured at about 50:50, although alternate ratios still show lesser (albeit still beneficial) levels of foamability compared to samples with 0% denaturation (i.e. 1.5% or 3.3% fat milk) or a 100% denatured test sample.

Total Solids

Total solids can be an important factor which may contribute to both viscosity and mouthfeel.

Preferably, the total solid content is configured to be between about 9.0% w/w to about 12% w/w.

Although the present invention provides the ability to retain a markedly improved result with essentially no fat, one issue faced by the inventor is that the "no fat" composition has slightly less total solids (about 1.5% w/w less) than the recombined milk variety as previously developed. To help circumvent this issue, the total solid level may be manipulated to achieve the desired level.

If the total solid level falls below about 9.0% w/w, gradual decreases in viscosity and mouth feel may be observed.

Alternatively, one disadvantage of increasing the total solid content beyond 12% w/w is that the calorific content will increase.

More preferably, the total solid content is configured to be approximately 10.5% w/w.

For example, the total solid content may be increased to fall within the preferred range, by adding components such as whey powder (12.5% protein, 74.5% lactose, 0.9% fat), skimmed milk powder or lactose powder. Whey powder is preferred because it is cost effective and easier to handle than most other options.

To exemplify this beneficial effect, in preliminary trials, total foam volume was significantly improved when 1.5% w/w whey powder was added to a composition containing skimmed milk and a heated retentate. This brought the total solid level from 9.5% w/w to 10.5% w/w, and resulted in a product with better foamability and foam stability.

Phospholipid

Preferably, the composition is substantially void of phospholipid.

Without being bound by theory, it is thought that the phospholipids compete with milk proteins for the water-bubble (air) interface, which could cause bubble instability and collapse.

Method of Manufacture of the Composition

In the context of the present invention, it should be appreciated that method of manufacture of the composition can encompass at least the following scenarios (or combinations thereof):
  a) wherein the composition either forms the whole of, or a part of, a pre-prepared beverage well before the intended aeration and consumption (e.g. as a pre-made stored drink);
  b) wherein the composition is used on its own as the actual beverage (without addition to another beverage or liquid base) for subsequent aeration; and/or
  c) wherein the composition is provided as a base for subsequent preparation of an aerated beverage and consumption.

Taking these scenarios into account, the following preferred embodiments are discussed.

Preferably, the method includes agitating the composition in a liquid aerated beverage form to introduce entrapped bubbles into the beverage.

The inventors have trialed two different whisking speeds (9000 rpm and 13000 rpm) for the test samples. It was surprisingly found that at both high and low speeds, the beneficial bubble formation, retention and sensory-perception results were substantially better than the market control product (1.5% fat commercial pasteurized milk). Even at low whisking speed (9000 rpm), which may more desirable from a usage perspective, the test samples was comparable to the Carrageenan test sample, (0.035% carrageenan added to baseline control product) and outperformed it on the grounds of overall mouthfeel and creaminess.

These results are significant, as it means the ease of use and reproducibility of the invention may be substantially better than compared to previous techniques to produce a frothy beverage. For example, in NZ 564378 it describes a complicated process of using pressure and temperature and then tries to manipulate and/or improve this process to improve the quality of froth/bubble formation in hot milk-based beverages. The current invention does not rely on pressure or steam in order to produce the beneficial results, and the longevity of the bubbles is also remarkably improved.

Another significant advantage of the present invention is its versatility to both hot and cold (or intermediate temperature drinks). Many conventional drinks or processes such as that described in NZ 564378 are essentially limited to one or the other. Commercially, having a solution to the problems that satisfies both hot and cold beverage requirements is hugely beneficial.

In one very useful embodiment, the invention is provided as a ready to drink (RTD) beverage that can be aerated by shaking before drinking in a bottle itself or in a closed container.

Method of Manufacture of the Denatured Retentate

Preferably, the milk-based retentate is heat treated to denature (fully or partially) at least the some or all of the whey proteins.

It should be appreciated that denaturing a milk-based retentate is not a standard practice.

In trials, the inventors found that denaturing the proteins in the retentate substantially helped to increase viscosity of the resulting beverages, and in doing so further improved bubble retention. This treatment also was found to improve overall sensory perception results.

Denaturing the retentate produced better results than use of un-denatured retentates. Additionally if whey protein alone is heated (without casein or other proteins), it did not give desired foamability characteristics.

Without wishing to be bound by theory, the inventors think heating the retentate according to the preferred conditions described herein causes the whey protein to denature. It is possible the whey protein, once denatured, binds to casein micelles (also in the retentate) and leads to different characteristics than seen with just heating a solution containing only the whey proteins. It may also be possible that the protein aggregate formed by heat treatment adsorb onto the bubble-water interface which in some way improves the bubble retention.

Heat treatment may be performed through numerous methods as described further below.

The method includes heating the milk-derived retentate completely separate to the skimmed milk in the composition. This supports the previous preferred embodiment regarding the ratio of denatured to un-denatured protein in the composition.

The retentate is heated between 60-95° C. for a duration of 5-120 minutes.

More preferably, the retentate is heated between 80-90° C. for a duration of 70-85 minutes.

Surprisingly, the foaming and/or mouthfeel characteristics of the beverage were significantly heightened when the latter conditions were used. For instance, if a lesser time/ temperature parameters are used, decreased levels of denaturation may be observed, and the beneficial results may not be as pronounced.

These conditions suit an industrial setting where the retentate can be heated using a heat exchanger using the desired temperature in a short period of time. Then the heat can be maintained in an insulated temperature controlled environment.

Also, the time frame represents an industrial heating environment where the temperature is already raised to that level prior to heating.

Preferably, the milk-based retentate has been prepared through ultra-filtration.

The advantages of using ultra-filtration methods include that no coagulation of protein occurs, it is a very common and easy process, it is non-erosive, requires no chemical treatment, uses existing capabilities of most plants, and is in liquid form.

Summary of the Advantages of the Present Invention

The desirable effects seen in the sensory perception trials is imparted by the bubble quality, and bubble retention are not reliant on any substantial fat or exogenous thickeners being required in the composition. Therefore, the indulgent, good mouthfeel may be provided without an unhealthy aspect to the drink, and may be considered naturally made;

The results may be achieved even when the product is fully derived from milk components, an important commercial advantage and focus of the applicant's invention. This reflects that in New Nutrition Business 2014 forecast, natural functionality is the number 1 predicted trend;

Comparable or improved bubble retention compared to positive market controls (e.g. 1.5% or 3.3% w/w fat pasteurized milk and the commercial formulation containing Carrageenan);

Similar or improved sensory perception compared to market controls (as above);

The method of use is very simple compared to prior art methods using techniques such as pressure and heat to froth milk. Commercially, this is a very important advantage.

The present invention may be used towards hot, ambient or cold temperature beverages. In the past, cold application has been particularly difficult. This innovation is considered to be particularly ground-breaking in relation to development of froth formation and retention in cold beverages but it may also be applied to either hot or ambient beverages and provide very beneficial results.

The resulting composition has beneficial advantages when used for a non-aerated beverage, as it shows improved mouthfeel compared to other low fat milk options.

The resulting composition may undergo optional downstream processing without negative results being observed, including homogenization, pasteurization, or UHT treatment.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Example 1: Exemplary Composition

| Component | Amount (% w/w) |
| --- | --- |
| Heated retentate | 24 |
| Skim milk (0.06% w/w fat) | 74.5 |
| Whey powder (12.5% protein, 74.5% lactose, 0.9% fat) | 1.5 |
| Total | 100 |

NB: the total protein equates to 5.7% w/w, provided from the UF retentate, skim milk and whey powder. The total solids (TS) equates to 10.5% w/w.

Example 2: Method of Preparing the Retentate

1. A skimmed milk sample was passed through an UF spiral membrane such as a polysulfone or ceramic filter.
2. The permeate is passed through the filter, containing the lactose.
3. The retentate is collected, and comprises the concentrated milk proteins.
4. The retentate is then heated at 85° C. for 80 minutes to allow denaturation.

Example 3: Method of Manufacture of the Composition

1. Skim milk and pre-heat treated UF retentate are mixed to form a first mixture. The skim milk is pre-warmed to 65° C. prior to combination.
2. The whey powder is added and then mixed with the first mixture to form a second mixture.
3. This second mixture is pre-homogenized in a high shear mixer (such as a Silverson) or a high speed mixer for 2 min at 65-70° C.
4. The pre-homogenized mixture is then homogenized at 65-70° C. in a 2-stage homogenizer at 200/50 bar.
5. The homogenized mixture is then pasteurized at 74° C. for 15 seconds and filled in bottles. Alternatively, the mixture is UHT treated.
6. This milk may then be stored or used immediately for aeration purposes before consumption.

It should be appreciated that the beverage can be spray dried. For example, the drying method can be freeze drying, drum drying or tray drying.

Example 4: Method of Aerating a Beverage Including the Composition

1. Prior to consumption, the composition is made into a solution, if this has not already been done.
2. Aeration of a cold beverage is done by whisking the beverage by hand mixing or mechanical mixing at a speed of 1000-15000 rpm for approximately 10-120 seconds.
3. In another use, ready to drink (RTD) beverages can be prepared using the composition and packed in bottles or carton after pasteurization/UHT/hot fill/Tunnel pasteurization. Preferably some headspace will be provided in the packaging.

Shaking of the bottle/carton will create broth/bubble within the beverage, which will subsequently enhance the sensory characteristics.

It should be appreciated that although preliminary tests were performed with a cold beverage, it is expected that application of the present invention to hot beverages may be more common. The tests were performed on a cold beverage as foam stability was seen by the inventors as more of a potential technical issue compared to hotter conditions.

Example 5: Sensory Evaluation of Composition

Figure 1:
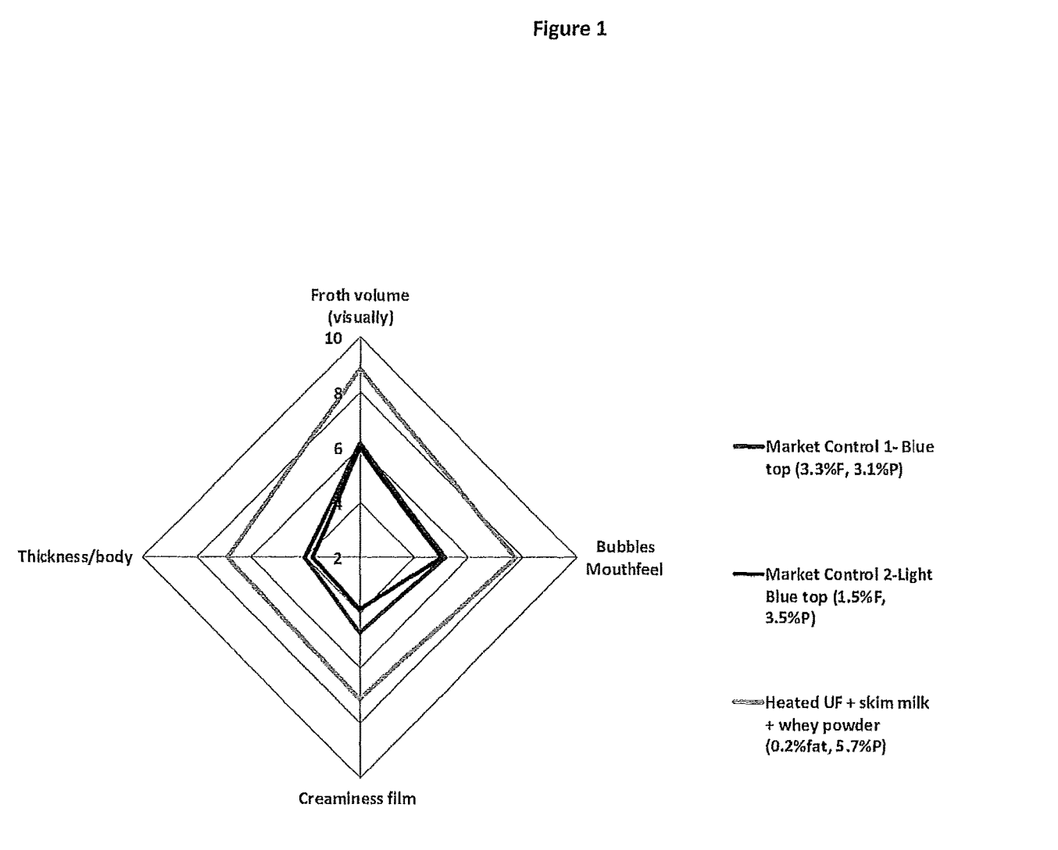
FIG. 1 Sensory evaluation of pasteurized "no fat" milk according to the present invention following after whisking in a milkshake maker for 30 seconds FIG. 2 Sensory evaluation of texture of pasteurized "no fat" milk according to the present invention as a non-aerated milk alternative.

FIG. 1 illustrates sensory results of the composition as shown in Example 1, after being aerated according to Example 3.

FIG. 1 showed that the test composition performed significantly better foamability and associated sensory characteristics than blue and light blue top milk, despite having only 0.2% fat content.

Figure 2:
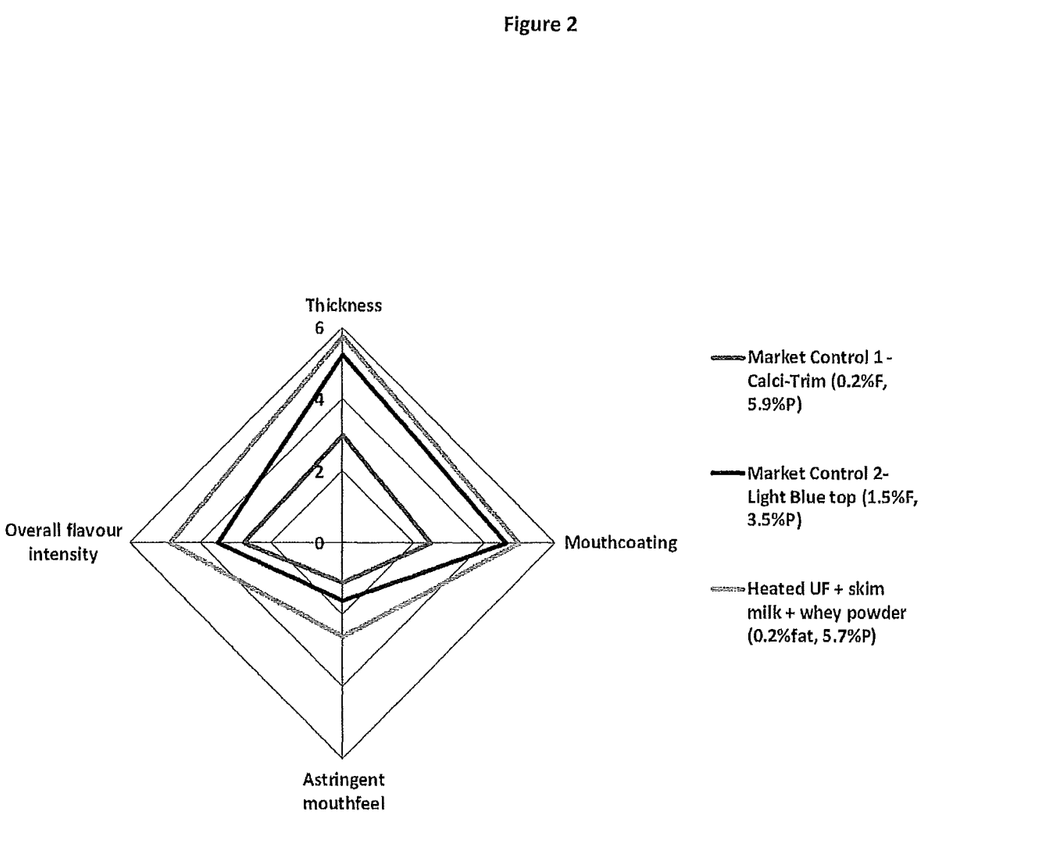

FIG. 2 illustrates sensory results of non-aerated samples. It shows that the test composition had better texture profiles than "Calci-trim". Calci-trim includes a similar level of fat (0.2%) and protein (5.9%) to the test composition. Therefore, a key difference is the denatured retentate in the test composition which is leading to the beneficial results seen. The test composition also slightly better texture profiles compared to non-aerated 1.5% fat (light blue) milk.

Example 6: Effect of Adding Whey Powder

Total solid content is considered to be a highly beneficial aspect to control which can contribute to both improved foamability and foam stability characteristics.

Figure 3:
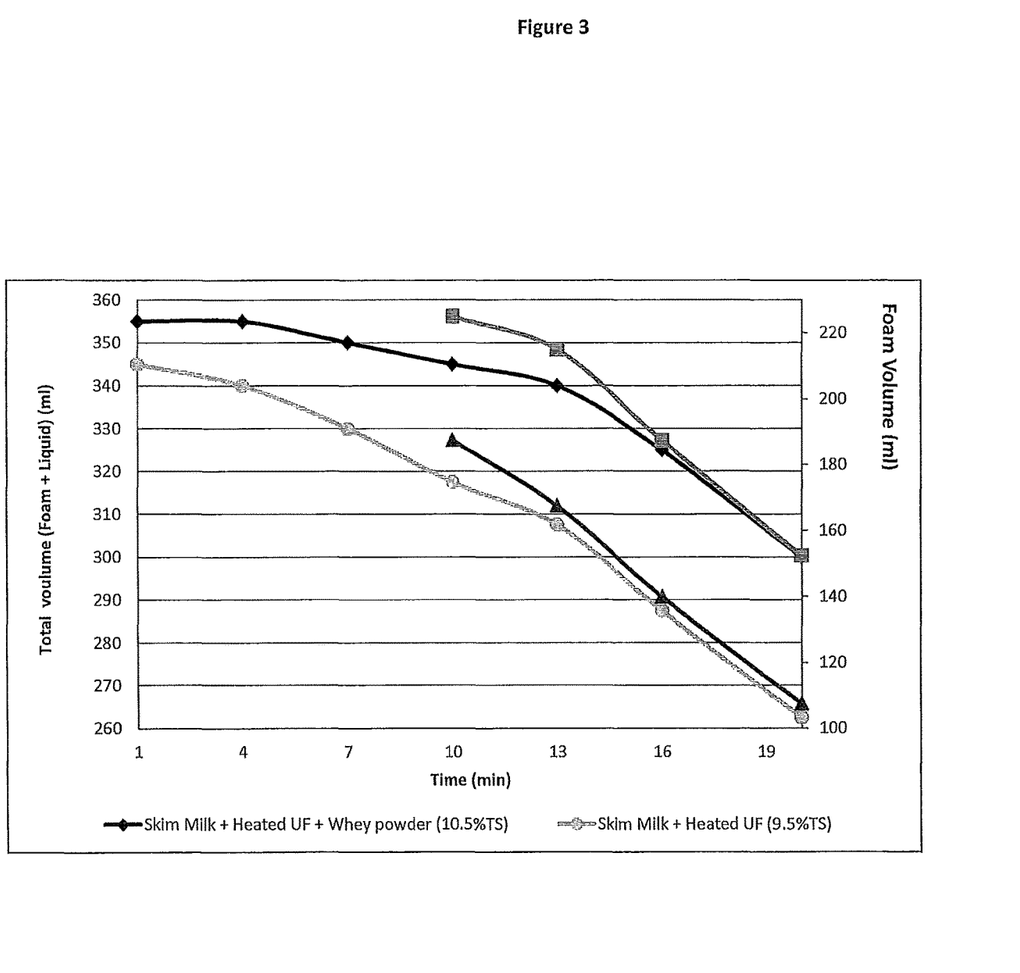
FIG. 3 Effect of adding whey powder

As shown in FIG. 3, the test composition containing 10.5% total protein outperformed the test composition containing 9.5% total solids, especially over the first 13 minutes following aeration when a beverage is most likely to be consumed. After 13 minutes both products foam stability declined, but at an equal rate.

Example 7: Effect of Varying Ratio of Denatured to Un-Denatured Protein within Test Composition It was found that careful adjustment of the denatured: un-denatured protein ratio led to different foam volume results.

As illustrated in FIGS. 4 and 5, it was identified that by configuring the composition to include approximately 50:50 ratio of denatured to un-denatured protein provided the most optimal foamability and stability results. However, there is clearly a beneficial range between about 10:90 to 90:10 ratio of denatured to un-denatured protein.

Although not shown in FIGS. 4 and 5, tests were conducted on Blue top (3.3% fat) milk, Light blue top (1.5% fat) and a test sample with 100% denatured protein.

For the Blue top milk sample containing a ratio of 0:100 denatured to un-denatured protein, the total foam volume depleted quickly to 245 ml within 7-8 minutes.

For the Light Blue top milk sample (also with no denatured protein), the total foam volume also depleted much faster than all the test samples shown in FIGS. 4 and 5, albeit not at the sharp rate as seen with the Blue top milk. Total volume had depleted to about 285 by about 10 minutes, and to 245 ml by about the 13 minute time point.

For the 100:0 denatured test sample, it performed very similarly (poorly) to the Light Blue top milk sample, again significantly worse than all the test samples with varying degrees of denatured to un-denatured protein.

A further point of difference is that with the Blue Top, Light Blue Top and the denatured test sample, each produced disadvantageous macro-foams, and hence lower sensory quality compared to the micro-foams produced by the present invention.

Example 8: Stability (Viscosity/Particle Size and pH Vs Time)

The test composition (of Example 1) was analysed over a two week period at 4° C. The results are shown below. Viscosity, particle size and pH are all stably maintained. Preliminary results from long-term (3 month) stability trials for UHT treated samples show full stability (results not shown) at 20° C., 30° C. and 40° C. No effect was seen on UHT samples with regards to foamability, foam stability and/or overall mouth feel.

|  | Viscosity (mPa · S) | Particle size D(3, 2) | D(4, 3) | pH |
|---|---|---|---|---|
| Week 0 | 3.24 | 0.1 | 0.121 | 6.7 |
| Week 1 | 3.41 | 0.1 | 0.121 | 6.61 |
| Week 2 | 3.49 | 0.1 | 0.121 | 6.64 |

Example 9: Viscosity Measurements

Various samples were analysed to assess their viscosities. As noted previously, it is thought the aggregates caused by the denaturation of the retentate lead to an increased viscosity of the composition, and thus might be contributing to the improved functional (e.g. foamability) and foam stability and sensorial properties.

As can be seen in the table below, the heated retentate shows considerably higher viscosity levels than the unheated retentate. Equally, the "no fat" composition (skim milk+ heated retentate and whey powder) has a higher viscosity that it's closest counter-part; Calci-trim.

| Sample | Viscosity (mPa · S) |
|---|---|
| Unheated Ret (12.5% P) | 16.45 |
| Heated Ret (12.5% P) | 42 |
| Market Green top (0.4% F, 3.7% P) | 2.14 |
| Market Calci trim (0.2% F, 5.9% P) | 3.01 |
| No Fat milk – Skim milk + heated UF + whey powder(0.2% F, 5.7% P) | 3.24 |

Example 10: Exemplary Commercial Applications

These are some examples of how the present invention may be applied to commercial products (should not be seen as limiting):
a) Hot and cold application
b) Milk shakes, coffee, beverage at home
c) A ready to drink (RTD) beverage that can be aerated by shaking before drinking in the bottle itself or in a closed container.
d) Milk shakes, coffee beverage at café, food service or fast food outlets
e) RTD beverage-processed and stored under frozen, chilled and ambient conditions
f) Powder form
g) Smoothie
h) Frozen beverages
i) Ready to eat desserts
j) In capsules for coffee or beverage machines, as powder or liquid source of milk
k) Cold cappuccino
l) Blended with soy, juice etc.
m) Fortified with functional ingredients
n) Carbonated
o) Added/flushed with liquid nitrogen Aspects of the present invention have been described by way of example only and it should be appreciated that modifications and additions may be made thereto without departing from the scope thereof as defined in the appended claims.

What we claim is:

1. A milk-based composition characterized in that the composition comprises:
a skimmed milk source
less than 0.5% w/w fat;
a milk-derived, fully denatured retentate;
wherein a final composition, after preparation, includes about 3.5 to 6% w/w protein and includes a ratio of denatured to un-denatured protein in a range of between about 10:90 to 90:10.

2. The composition as claimed in claim 1 wherein the final composition includes a ratio of denatured to un-denatured protein in the range of between about 30:70 to 70:30.

3. The composition as claimed in claim 1 wherein the final composition includes a ratio of denatured to un-denatured protein in the range of between about 40:60 to 60:40.

4. The composition as claimed in claim 1 wherein the final composition includes a ratio of denatured to un-denatured protein in the range of between about 45:55 to 55:45.

5. The composition as claimed in claim 1 wherein the final composition includes a ratio of denatured to un-denatured protein of approximately 50:50.

6. The composition as claimed in claim 1, wherein the final composition only contains milk-based components.

7. The composition as claimed in claim 1, wherein the milk-derived, fully denatured retentate contributes approximately between 10 to 90% w/w of an overall protein to the composition.

8. The composition as claimed in claim 1, wherein the milk-derived, fully denatured retentate contributes approximately between 30 to 70% w/w of an overall protein to the composition.

9. The composition as claimed in claim 1, wherein the milk-derived, fully denatured retentate contributes approximately between 40 to 60% w/w of an overall protein to the composition.

10. The composition as claimed in claim 1, wherein the composition includes a total solid content of between about 9% w/w to about 12% w/w.

11. The composition as claimed in claim 1, wherein the composition includes about 5.7% w/w protein.

12. The composition as claimed in claim 1, wherein the composition is in the form of an aerated milk-based beverage or a non-aerated milk-based beverage.

13. A method of manufacturing a milk-derived, denatured retentate for use in preparing a milk based composition, said method comprising:
a) fully denaturing a milk derived retentate at 60-95° C. for a duration of 5-120 minutes;
b) adding the fully denatured retentate to a skimmed milk source to produce a final milk-based composition;
wherein the final composition, after preparation, includes about 3.5 to 6% w/w protein and includes a ratio of denatured to un-denatured protein in a range of between about 10:90 to 90:10.

* * * * *